United States Patent
Gigler et al.

(10) Patent No.: US 10,118,829 B2
(45) Date of Patent: Nov. 6, 2018

(54) PROCESSES FOR PRODUCING SILICON

(71) Applicant: Wacker Chemie AG, Munich (DE)

(72) Inventors: Peter Gigler, Dachau (DE); Juergen Stohrer, Pullach (DE)

(73) Assignee: WACKER CHEMIE AG, Munich (DE)

( * ) Notice: Subject to any disclaimer, the term of this patent is extended or adjusted under 35 U.S.C. 154(b) by 27 days.

(21) Appl. No.: 15/521,044

(22) PCT Filed: Oct. 24, 2016

(86) PCT No.: PCT/EP2016/075501
§ 371 (c)(1),
(2) Date: Apr. 21, 2017

(87) PCT Pub. No.: WO2017/072064
PCT Pub. Date: May 4, 2017

(65) Prior Publication Data
US 2017/0334729 A1     Nov. 23, 2017

(30) Foreign Application Priority Data

Oct. 29, 2015 (DE) ........................ 10 2015 221 226

(51) Int. Cl.
*C01B 33/023* (2006.01)

(52) U.S. Cl.
CPC ........ *C01B 33/023* (2013.01); *C01P 2006/80* (2013.01)

(58) Field of Classification Search
CPC ............................ C01B 33/023; C01P 2006/80
See application file for complete search history.

(56) References Cited

U.S. PATENT DOCUMENTS

| 7,615,206 B2 | 11/2009 | Sandhage et al. |
| 8,268,481 B2 | 9/2012 | Treger |
| 2009/0092899 A1 | 4/2009 | Treger |

FOREIGN PATENT DOCUMENTS

| KR | 10-0493960 B1 | 6/2005 |
| TW | 1287890 B | 10/2007 |
| WO | 2008/067391 A2 | 6/2008 |
| WO | 2010/139346 A1 | 12/2010 |
| WO | 2011/042742 A1 | 4/2011 |
| WO | 2012/114126 A1 | 8/2012 |
| WO | 2013/147958 A2 | 10/2013 |
| WO | 2013/179068 A2 | 12/2013 |

OTHER PUBLICATIONS

Von Gattermann ber. Deut, chem. Ges. 1889,22, 186.
Holleman and Wiberg: "lehrbuch der Anorganischen Chemie," 1995, 101st edition, p. 877.
Zhihao Bao et al., "Chemical Reduction of Three-Dimensional Silica Micro-Assemblies Into Microporous Silicon Replicas," Nature, Mar. 8, 2007, vol. 446, p. 172 ff.
Weinekoetter and Gericke: "Mischen-von-Feststoffen," Springer 1995, Chapter 6.

*Primary Examiner* — Melvin C. Mayes
*Assistant Examiner* — Michael Forrest
(74) *Attorney, Agent, or Firm* — Brooks Kushman P.C.

(57) ABSTRACT

Silicon is produced by magnesiothermic reduction of silicon dioxide, wherein to achieve magnesiothermic reduction a reactant mixture is employed which contains silicon dioxide ($SiO_2$) and magnesium (Mg) and, as moderators, magnesium oxide (MgO) and silicon (Si), and optionally further moderators.

11 Claims, No Drawings

PROCESSES FOR PRODUCING SILICON

CROSS REFERENCE TO RELATED APPLICATIONS

This application is the U.S. National Phase of PCT Appln. No. PCT/EP2016/075501 filed Oct. 24, 2016, which claims priority to German Application No. 10 2015 221 226.2 filed Oct. 29, 2015, the disclosures of which are incorporated in their entirety by reference herein.

BACKGROUND OF THE INVENTION

1. Field of the Invention

The invention relates to processes for producing silicon by magnesiothermic reduction of silicon dioxide.

2. Description of the Related Art

Silicon-comprising products are ubiquitous in the current product environment, in particular in the electronics field, for example in semiconductors, lithium-ion batteries or solar cells. There is therefore a constant need to further improve processes for producing silicon. One established chemical method for obtaining silicon is a reduction of silicon dioxide with magnesium (magnesiothermic reduction) which is elucidated by the following reaction scheme:

$$SiO_2 + 2Mg \rightarrow 2MgO + Si$$

Magnesiothermic reduction generally forms considerable amounts of magnesium silicate or magnesium silicide, for example, as byproducts.

Magnesiothermic reduction was first described in 1889 by Gattermann in Ber. Deut. Chem. Ges. 1889, 22, 186. The enormous reaction enthalpy $\Delta H$ of the reaction ($\Delta H=-293$ kJ/mol) was noted even then. To keep the progress of the reaction controllable Lehrbuch der Anorganischen Chemie, Holleman and Wiberg (1995, 101st edition, page 877) recommends addition of magnesium oxide as a moderator. To this end, WO 2008/067391 A2 recommends cooling the reactor or adding inert materials, for example metal (oxides) or metal salts, for example, chlorides, sulfides or nitrates. Particular examples of inert materials are sodium chloride or alternatively magnesium oxide, which are employed in the starting mixture in a proportion of 72 wt % (MgO) or 65 wt % (NaCl), for example. The reduction is effected discontinuously. WO 2011/042742 A1 recommends sodium chloride or alternatively calcium chloride as moderators for the reduction of $SiO_2$ with magnesium.

However, a great many processes for magnesiothermic reduction that operate without moderator addition are also known. Thus, U.S. Pat. No. 7,615,206 B2 describes a discontinuously performed magnesiothermic reduction without moderators. U.S. Pat. No. 7,615,206 is concerned in particular with the preparation of silicon having special nano- to microscale structures by structure-maintaining reaction of a nano- to microscale silica starting structure, such as diatomaceous earth for example. This document is based on the observation that the reduction of silicon dioxide with magnesium proceeds with structure maintenance, as discussed in Nature 2007, 446, 172. Magnesiothermic reduction of $SiO_2$ thus makes it possible to generate defined silicon structures with structure maintenance. Further unmoderated variants of magnesiothermic reduction are also described in WO 10139346 A1, WO 2013179068 A2, KR 100493960, TWI 287890B and WO 2013/147958 A2. U.S. Pat. No. 8,268,481 BB described processes for producing silicon by reduction of pyrogenic silica with metallic reducing agents, such as magnesium or aluminum for example. The addition of flow agents or solvents is recommended to activate the metallic reducing agent and the use of highly heat-conductive metals, such as copper or brass, is recommended to control the reaction temperature. Discontinuous processes are described.

Against this background there is a continuing need in the magnesiothermic reduction of $SiO_2$ to control the great, abruptly liberated heat of reaction.

This poses a serious problem, in particular for performance of the reaction on an industrial scale. While the heat of reaction can be absorbed by addition of moderators such as sodium chloride, the removal thereof from the reaction mixture necessitates additional complexity, for example a further washing step, which represents extra inconvenience and additionally generates further quantities of waste which must be sent for complex disposal or recycling at great economic cost.

SUMMARY OF THE INVENTION

It is accordingly an object of the invention to modify the magnesiothermic reduction of silicon dioxide such that the reaction temperature may be controlled and the complexity of removal of moderators simultaneously reduced. Additionally, as far as possible, the yield of silicon should be increased and the scale of formation of the byproducts, in particular of magnesium silicate, should be reduced. It has now been found that, surprisingly, these and other objects were achieved by adding magnesium oxide and also silicon to the reactants of the magnesiothermic reduction as moderators. Thus, moderators obtainable as products of the magnesiothermic reduction were added to the reactants.

DETAILED DESCRIPTION OF THE PREFERRED EMBODIMENTS

The invention provides processes for producing silicon by magnesiothermic reduction of silicon dioxide, wherein to achieve magnesiothermic reduction a mixture ("reactant mixture") is employed which comprises silicon dioxide ($SiO_2$), magnesium (Mg) and, as moderators, magnesium oxide (MgO) and silicon (Si) and optionally further moderators.

The silicon dioxide may be in amorphous or crystalline form. It may be of synthetic or natural origin. Examples of silicon dioxide are pyrogenic silica, precipitated silica, quartz, tridymite, christobalite, diatomaceous earth or $SiO_2$ bound in the form of silicates, such as forsterite or enstatite. Preference is given to synthetic, amorphous silicas, particular preference being given to pyrogenic silica.

The volume-weighted particle size distribution $D_{50}$ of the $SiO_2$ particles is for example 10 nm to 500 µm, preferably 100 nm to 100 µm and more preferably 500 nm to 50 µm (determination method: static light scattering, Horiba LA 950 instrument, dispersion medium water).

The specific surface area (BET) of the $SiO_2$ is for example 1 to 500 m²/g, preferably 10 to 300 m²/g and more preferably 15 to 200 m²/g (determined according to DIN 66131 (with nitrogen), for example using a Porotec Sorptomatic 1990 instrument).

Magnesium may be employed for example in the form of wire, preferably in the form of shavings and more preferably in the form of powder. The particle size of the magnesium is for example 1 µm to 1 mm, preferably 5 µm to 500 µm and more preferably 10 µm to 200 µm.

The stoichiometric ratio of silicon dioxide to magnesium ($SiO_2$/Mg) in the reaction mixture is preferably 0.3 to 1, more preferably 0.4 to 0.7 and most preferably 0.4 to 0.6.

The silicon and the magnesium oxide and any further moderators present in the reactant mixture are hereinbelow also referred to collectively as moderators.

Further moderators, for example magnesium silicate, may optionally be employed. Examples of further moderators are alkali metal and alkaline earth metal halides, such as sodium chloride or calcium chloride.

The reactant mixture preferably comprises preferably 45 to 95 wt %, preferably 50 to 93 wt % and most preferably 55 to 90 wt % of magnesium oxide based on the total weight of the moderators. The reactant mixture preferably comprises 3 to 40 wt %, more preferably 4 to 35 wt % and most preferably 5 to 30 wt % of silicon based on the total weight of the moderators. Any further moderators are present in the reactant mixture in an amount of for example 0 to 40 wt % and preferably 0 to 20 wt % based on the total weight of all moderators.

The moderators are preferably a mixture obtained by a magnesiothermic reduction of $SiO_2$, in particular a magnesiothermic reduction of $SiO_2$ according to the invention. Such a mixture may comprise for example silicon, magnesium oxide and optionally further components, such as magnesium silicate. Moderators may additionally be added to the mixture.

Silicon dioxide and magnesium are hereinbelow also referred to collectively as reactants.

The weight ratio of the reactants to the moderators comprising silicon and magnesium oxide is preferably 0.05 to 1, more preferably 0.2 to 0.7 and most preferably 0.3 to 0.6.

The reactant mixture may comprise further optional constituents, for example dopants such as diboron trioxide. In the course of the magnesiothermic reduction diboron trioxide may for example be reduced to elemental boron and serve as a dopant for the resulting silicon. The proportion of the optional constituents is for example up to 5 wt %, preferably 1 ppb (part per billion) to 5 wt %, based on the total weight of the reactant mixtures.

To produce the reactant mixture the constituents thereof may be mixed in any desired sequence. The silicon dioxide and the magnesium may be employed separately or preferably in the form of a mixture. The moderators too may be added separately or preferably in the form of a mixture. It is particularly preferable when two or more, preferably all, moderators are introduced into the process in the form of a mixture.

It is preferable when the silicon and magnesium oxide moderators and optionally one or more further moderators are mixed first and then added to silicon dioxide or magnesium or preferably to a mixture of silicon dioxide and magnesium. The silicon dioxide and magnesium too are preferably mixed separately or more preferably together with one or more moderators, in particular with a mixture of two or more, or preferably with all moderators.

Silicon dioxide, magnesium, magnesium oxide and silicon are thus generally mixed before performance of the magnesiothermic reduction, i.e. generally before introduction into the reactor.

The mixing is preferably effected at ambient temperature, for example at room temperature, preferably at 15° C. to 35° C. The mixing is in any case effected at temperatures of preferably <400° C., more preferably ≤390° C. and most preferably ≤350° C.

To mix the constituents of the reactant mixture mixers commonly used therefor, in particular industrial mixers, may be employed. Examples of mixers are freefall mixers, such as container mixers, cone mixers, drum roller mixers, gyro mixers, tumble mixers or displacement and impeller mixers such as drum mixers and screw mixers. Further examples of suitable mixers are set out in "Mischen von Feststoffen" by R. Weinekötter and H. Gericke, Springer 1995.

The magnesiothermic reduction may be performed in reactors commonly used therefor, in particular furnaces, for example tube furnaces, rotary tube furnaces, chamber furnaces, belt furnaces or moving-grate furnaces. The reactors may be operated discontinuously or continuously. The reactors may optionally be cooled by conventional means. However, the reactor is generally not cooled.

The reactant mixtures may be introduced into the reactors for example in the form of pellets, granules or preferably in the form of powder beds.

The magnesiothermic reduction preferably takes place at 400 to 1200° C., more preferably at 500 to 1100° C., and most preferably at 600 to 1000° C.

The magnesiothermic reduction is generally initiated thermally, i.e. by heating the reactant mixture to a temperature within the abovmentioned temperature ranges.

The pressure in the reactor is preferably 0.5 to 10 $bar_{abs.}$, more preferably between 0.7 to 5 $bar_{abs.}$ and most preferably between 0.8 to 1.5 $bar_{abs.}$.

The magnesiothermic reduction is preferably performed under a protective gas atmosphere, in particular under an argon atmosphere or an argon/hydrogen atmosphere, in particular, one having a hydrogen proportion of ≤5 vol %.

The residence time of the reactant mixture in the reactor is preferably 1 second to 12 hours, more preferably 1 second to 6 hours, and most preferably 1 second to 3 hours.

The mixture leaving the reactor (product mixture) generally comprises silicon, magnesium oxide and optionally one or more further constituents, such as magnesium silicate, magnesium silicide or optionally boron. Furthermore, unconverted reactants may also be present, such as magnesium, silicon dioxide or optionally diboron trioxide.

The product mixture preferably comprises 3 to 40 wt %, more preferably 4 to 35 wt % and most preferably 5 to 30 wt % of silicon; preferably 45 to 95 wt %, more preferably 50 to 93 wt % and most preferably 55 to 90 wt % of magnesium oxide; preferably 0 to 40 wt %, more preferably 0 to 30 wt % and most preferably 0 to 20 wt % of further constituents, wherein the reported wt % values are each based on the total weight of the product mixture and for each product mixture sum to 100 wt %.

The magnesiothermic reduction may be performed as a batch process or preferably as a recycle process. In a batch process the mass flow passes through the reactor only once in customary fashion. In a recycle process the product mixture is fully or preferably partly reintroduced into the reactor (recycle mixture). The recycle mixture is preferably mixed with reactants and optionally one or more moderators and subsequently introduced into the reactor. The optionally remaining part of the product mixture may for example be sent for utilization, in particular for workup.

The recycle mixture is preferably 50 to 95 wt %, more preferably 55 to 85 wt % and most preferably 60 to 75 wt % based on the total weight of the respective product mixture. The composition of the recycle mixture is generally identical to the abovementioned composition of the product mixture.

In a preferred embodiment the recycle mixture thus functions as moderator.

During operation of the recycle process the proportion of the recycle mixture in the total amount of the altogether employed amount of moderators at a particular point in time in the process is preferably 70 to 100 wt %, more preferably 80 to 100 wt % and most preferably 90 to 100 wt %. It is most preferable when recycle mixture is exclusively employed as the moderator during operation of the recycle process. It is preferable when during operation of the recycle process no further silicon and/or no further magnesium oxide are added to the reactants in addition to the recycle mixture.

In a preferred embodiment, moderators from outside the process are thus introduced into the process mixed with the reactants only during startup of the recycle process. Startup of the recycle process refers, as is common knowledge to the period in the process from the start of the process up to the point in time at which the recycle process passes over into the continuous mode of operation, i.e. at which product mixture mixed with reactants is introduced into the reactor.

The recycle mixture is preferably cooled to a temperature of <400° C., more preferably ≤390° C. and most preferably ≤350° C. The cooling may be effected by conventional means, actively or passively, for example by water cooling or air cooling. As is customary, external cooling is employed. External cooling is to be understood as meaning that the cooling medium does not come into contact with the recycle mixture but rather cools an apparatus, for example pipes or other customary cooling apparatuses, through which recycle mixture is passed or which contain recycle mixture.

The workup of product mixtures may be effected for example by addition of one or more acids. Examples of acids are hydrohalic acids such as hydrochloric acid or hydrofluoric acid; carboxylic acids such as acetic acid; or oxoacids of phosphorus such as phosphoric acid. Preference is given to acetic acid or hydrochloric acid. When two or more acids are employed these may be employed as a mixture or preferably consecutively. Workup may thus also be effected in two stages with different acids, for example by a first acid treatment with hydrochloric acid and a second treatment with hydrofluoric acid.

The acids are preferably employed in the form of aqueous solutions. The concentration of the acids employed is preferably 0.01 to 10 mol/L, more preferably 0.1 to 8 mol/L, and most preferably 1 to 5 mol/L.

The molar ratio of the protons of the acids to the magnesium oxide of the product mixture to be worked up is preferably at least 2 to 1.

The silicon thus obtained may finally be dried, for example at temperatures of 0° C. to 200° C., preferably at 20° C. to 150° C. and more preferably at 40° C. to 100° C. The pressure during drying is preferably 0.01 to 1 $bar_{abs.}$ and more preferably 0.1 to 0.5 $bar_{abs.}$.

The product comprises preferably 50 to 100 wt %, more preferably 60 to 100 wt % and most preferably 70 to 100 wt % of silicon based on the total weight of the product.

The silicon produced in accordance with the invention may be used as an input material in any commonly used applications for silicon, for example in electronic applications. Particular examples are semiconductors, solar cells, thermoelectric generators and in particular as active material for lithium-ion batteries.

It was found with the present invention that addition of silicon and magnesium oxide as moderators to silicon dioxide and magnesium allows the heat of reaction of the magnesiothermic reduction, and thus the process, to be controlled. Surprisingly, the use of the moderators according to the invention results in higher silicon yields. Happily, formation of the byproduct magnesium silicate was reduced.

Performance of the process according to the invention as a recycle process is particularly advantageous. Here, for example, a portion of the product mixture generated in the magnesiothermic reduction can be used as inventive moderator mixture for the magnesiothermic reduction according to the invention. In this case it is advantageous when no additional external moderator material, which would additionally require subsequent removal or represents a possible source of contamination, is introduced into the process. One portion of the product mixture may thus be recycled for reuse as moderator while the other portion may be supplied to the product workup. This enhances the economy of the magnesiothermic reduction according to the invention.

The examples which follow further elucidate the invention:

In the examples which follow, all amounts and percentages are by weight, all pressures are 0.10 MPa (abs.) and all temperatures are 20° C. unless otherwise stated. The reported elemental contents (Mg, Si) were determined by ICP (inductively coupled plasma) emission spectroscopy (Perkin Elmer Optima 7300 DV instrument). The oxygen content was calculated from the difference from 100%.

The product compositions were calculated starting from the elemental contents (Si, O, Mg) under the boundary condition, demonstratably satisfied via XRD, that magnesium oxide was fully removed in the aqueous workup and the isolated product was composed of Si(0), $Mg_2SiO_4$ and $SiO_2$. The Mg content of the isolated product was used to calculate the magnesium silicate content and subsequently the $SiO_2$ and Si(0) contents of the isolated product. The proportion of MgO present before the aqueous workup was determined from the dissolved amount of magnesium in the filtrate of the washing solution.

Comparative Example 1

Batch process, Mg-thermic reduction with MgO as moderator: 1.00 g of silicon dioxide (WACKER HDK® V15) and 0.81 g of magnesium powder (Alfa Aesar, item no. 10233, 325 mesh, 99.8%) were blended with 4.20 g of magnesium oxide (Sigma-Aldrich, item no. 342793, ≥99% trace metals basis, 325 mesh) with a mortar and pestle and subsequently heated to 900° C. for 2 h (heating rate 10° C./min) in a steel ampule in an argon-inertized tube furnace and then cooled.

5.75 g of the product mixture obtained having a composition of 5.0 wt % Si(0), 87.4 wt % MgO, 6.0 wt % $Mg_2SiO_4$, 1.6 wt % $SiO_2$ were added with ice-bath cooling to 120 g of acetic acid (20 wt % in water) and the mixture stirred for 3 h. The suspension obtained was filtered, washed with water (paper filter of pore size 4-7 μm; 4.95 g MgO dissolved in filtrate) and the residue was dried at 55° C. (2 mbar abs.) for 20 h. 0.71 g of product of elemental composition 55.0 wt % Si, 16.5 wt % Mg and 28.5 wt % 0 was obtained. This corresponds to 39.5 wt % Si(0), 47.8 wt % $Mg_2SiO_4$, 12.7 wt % $SiO_2$ and thus to a molar yield of Si(0) of 63% based on the amount of silicon employed in the form of $SiO_2$.

Example 2

Batch process, Mg-thermic reduction with a moderator mixture comprising Si and MgO:

1.16 g of silicon dioxide (WACKER HDK® V15) and 0.94 g of magnesium powder (Alfa Aesar, item no. 10233, 325 mesh, 99.8%) were blended with a moderator mixture consisting of 3.28 g of magnesium oxide, 1.03 g of silicon, 0.29 g of magnesium silicate and 0.29 g of silicon dioxide with a mortar and pestle and subsequently heated to 900° C. for 2 h (heating rate 10° C./min) in a steel ampule in an argon-inertized tube furnace and then cooled.

3.47 g of the product mixture obtained having a composition of 19.8 wt % Si(0), 68.1 wt % MgO, 9.2 wt % $Mg_2SiO_4$, 2.9 wt % $SiO_2$ were added with ice-bath cooling to 56 g of acetic acid (20 wt % in water) and the mixture stirred for 3 h. The suspension obtained was filtered, washed with water (paper filter of pore size 4-7 μm; 2.39 g MgO dissolved in filtrate) and the residue was dried at 55° C. (2 mbar abs.) for 20 h. 1.12 g of product of elemental composition 72 wt % Si, 10 wt % Mg and 18 wt % O were obtained. This corresponds to 62.0 wt % Si(0), 28.9 wt % $Mg_2SiO_4$, 9.1 wt % $SiO_2$. Subtracting the introduced proportions of the moderator mixture this results in a molar yield of Si(0) of 68% based on the amount of silicon employed in the form of $SiO_2$.

Compared to comparative example 1 the use of the moderator according to the invention results in an increased yield of elemental silicon.

| | |
|---|---|
| Comparative Example 1: | 63% Si(0) yield |
| Example 2: | 68% Si(0) yield |

Comparative Example 3

Mg-thermic reduction with MgO as moderator: (recycle process start):

16.6 g of silicon dioxide (WACKER HDK® V15) and 13.4 g of magnesium powder (Alfa Aesar, item no. 10233, 325 mesh, 99.8%) were mixed with 70 g of magnesium oxide (Sigma-Aldrich, item no. 63090, ≥97.0% based on calcined substance, KT) in a ball mill for 1 h and subsequently heated to 1000° C. for 4.5 h in an argon-inertized steel ampule in a muffle furnace and then cooled.

18.6 g of the product mixture obtained (4.4 wt % Si(0), 90.3 wt % MgO, 3.2 wt % $Mg_2SiO_4$, 2.1 wt % $SiO_2$) were added with ice-bath cooling to 409 g of acetic acid (20 wt % in water) and the mixture stirred for 4 h. The suspension obtained was filtered, washed with water (paper filter of pore size 4-7 μm; 16.8 g MgO dissolved in filtrate) and the residue was dried at 55° C. (2 mbar abs.) for 20 h. 1.80 g of product of elemental composition 62 wt % Si, 11.5 wt % Mg and 26.5 wt % O were obtained. This corresponds to the composition 45.4 wt % Si(0), 33.3 wt % $Mg_2SiO_4$, 21.3 wt % $SiO_2$ and thus to a molar yield of Si(0) of 57% based on the amount of silicon employed in the form of $SiO_2$.

Example 4

Recycle process, Mg-thermic reduction with a moderator mixture comprising Si and MgO:

16.6 g of silicon dioxide (WACKER HDK® V15) and 13.4 g of magnesium powder (Alfa Aesar, item no. 10233, 325 mesh, 99.8%) were mixed with 70 g of moderator (product mixture from comparative example 3) in a ball mill for 1 h and subsequently heated to 1000° C. for 4.5 h in an argon-inertized steel ampule in a muffle furnace and then cooled.

The mixture obtained here was used as moderator once again in an identical procedure as, likewise, was the product mixture in turn resulting therefrom.

14.6 g of the product mixture thus obtained (14.5 wt % Si, 72.8 wt % MgO, 6.7 wt % $Mg_2SiO_4$, 6.0 wt % $SiO_2$) were added with ice-bath cooling to 294 g of acetic acid (20 wt % in water) and the mixture stirred for 4 h. The suspension obtained was filtered (paper filter of pore size 4-7 μm; 10.6 g MgO dissolved in filtrate) and the residue was dried at 55° C. (2 mbar abs.) for 20 h. 3.95 g of product of elemental composition 68.5 wt % Si, 8.5 wt % Mg and 23 wt % O were obtained. This corresponds to 53.2 wt % Si(0), 24.6 wt % $Mg_2SiO_4$, 22.2 wt % $SiO_2$.

Comparison of the product compositions of comparative example 3 and example 4 shows that the inventive procedure enhanced the yield of silicon (Si(0)) and reduced the formation of the byproduct $Mg_2SiO_4$ for the economically and technologically advantageous recycle process too.

| | |
|---|---|
| Comparative Example 3: | 45.4 wt % Si(0), |
| | 33.3 wt % $Mg_2SiO_4$, |
| | 21.3 wt % $SiO_2$ |
| Example 4: | 53.2 wt % Si(0), |
| | 24.6 wt % $Mg_2SiO_4$, |
| | 22.2 wt % $SiO_2$ |

The invention claimed is:

1. A process for producing silicon by magnesiothermic reduction of silicon dioxide, comprising providing a reactant mixture comprising silicon dioxide and reducing silicon dioxide with magnesium in the presence of magnesium oxide and silicon as primary moderators, and optionally one or more further moderators.

2. The process of claim 1, wherein the reactant mixture comprises 45 to 95 wt % of magnesium oxide based on the total weight of all moderators.

3. The process of claim 1, wherein the reactant mixture comprises 5 to 55 wt % of silicon based on the total weight of all moderators.

4. The process of claim 2, wherein the reactant mixture comprises 5 to 55 wt % of silicon based on the total weight of all moderators.

5. The process of claim 1, wherein a mixture obtained by a magnesiothermic reduction of silicon dioxide is employed at least in part as a moderator.

6. The process of claim 1, wherein the weight ratio of silicon dioxide and magnesium to the moderators is 0.05 to 1.

7. The process of claim 1, wherein the product mixture obtained by magnesiothermic reduction comprises 3 to 40 wt % of silicon, 45 to 95 wt % of magnesium oxide and optionally 0 to 40 wt % of further constituents, wherein the wt % values are in each case based on the total weight of the product mixture and for each product mixture sum to 100 wt %.

8. The process of claim 1, wherein the magnesiothermic reduction is a batch process or a recycle process.

9. The process of claim 8, wherein the product mixture obtained in the recycle process is fully or partly introduced into the reactant mixture.

10. The process of claim 9, wherein 50 to 95 wt % of the product mixture obtained in the recycle process is introduced into the reactant mixture as a moderator.

11. The process of claim 9, wherein 70 to 100 wt % of the moderators are employed in the form of a product mixture.

\* \* \* \* \*